United States Patent [19]

Harden et al.

[11] Patent Number: 4,475,601
[45] Date of Patent: Oct. 9, 1984

[54] VARIABLE WIDTH PLOW SYSTEM WITH SHIM MEANS ADJUSTMENT

[75] Inventors: Eldon A. Harden, Naperville; Michael A. McSweeney, LaGrange, both of Ill.

[73] Assignee: International Harvester Co., Chicago, Ill.

[21] Appl. No.: 420,166

[22] Filed: Sep. 20, 1982

[51] Int. Cl.³ .................... A01B 15/00; A01B 65/02
[52] U.S. Cl. .................................. 172/283; 172/645; 172/742
[58] Field of Search ............... 172/283, 287, 413, 645, 172/647, 742

[56] References Cited

U.S. PATENT DOCUMENTS

| 4,036,305 | 7/1977 | Kinzenbaw | 172/283 |
| 4,073,345 | 2/1978 | Miller | 172/413 |
| 4,210,212 | 7/1980 | Jackson et al. | 172/645 |

FOREIGN PATENT DOCUMENTS 267927 1/1969 Austria ..................... 172/742

Primary Examiner—Richard T. Stouffer
Attorney, Agent, or Firm—Dennis K. Sullivan; F. David AuBuchon

[57] ABSTRACT

A plow system that includes a plurality of equally spaced plows, each of which is mounted on the inclined beam of the system by a mechanically adjustable mounting structure. The system also has a tail wheel that is associated with the last plow and steering linkage for the tail wheel. The mounting structure includes a generally vertical bore for rotational attachment to the beam and a laterally extending ear located adjacent the beam. A combination of a fastener and tapered shims between the ear and beam provide and maintain the desired furrow widths. The rotation of the plow system to correspond to the desired furrow width in conjunction with the steering linkage automatically positions the tail wheel for this furrow width.

8 Claims, 6 Drawing Figures

VARIABLE WIDTH PLOW SYSTEM WITH SHIM MEANS ADJUSTMENT

BACKGROUND OF THE INVENTION

1. Field of the Invention

This invention pertains generally to agricultural implements and more particularly to a plow system having a plurality of adjustable individual plow units mounted to a common frame that is adapted to be pulled by a tractor.

2. Description of the Prior Art

Current variable width plow systems are probably best exemplified by the system disclosed in U.S. Pat. No. 3,817,333 to Jon E. Kinzenbaw, issued June 18, 1974 and entitled PLOW SYSTEM WITH PLURALITY OF PLOW UNITS AND MEANS FOR ADJUSTING SPACING BETWEEN UNITS IN A CONTINUOUS MANNER. The system disclosed, however, is hydraulically actuated, that is the individual plow units are mounted on vertical axes on the plow frame and are connected to a guide beam which is reciprocated by the cylinder to change the plow inclinations and hold same, with the plow system then pivoting (while plowing) until the plows are again aligned at the new furrow width. This "on the go" changing of furrow widths is one of the main objectives of this patent and the system tail wheel steering is also related to the variable width feature so same is also automatically adjusted. However, the hydraulic equipment and other related structure are expensive and not always desired as the variable width feature may not be used too frequently and not necessarily while "on the go".

SUMMARY OF THE INVENTION

Applicants have designed a plow system that utilizes a plurality of equally spaced plow units each having a relatively large range of mechanical adjustment. The adjustment structure is simplified and adjustment can be very quickly achieved when the plow system is in the transport position supported by a tail wheel and the tractor (or a suitable stand) with the individual plow units out of the soil.

Specifically, applicants provide a particular mounting bracket for each plow unit and also for the tail section which has a plow unit and a tail wheel located thereon. The bracket has a vertical bore for rotational attachment to the inclined main beam and a laterally extending ear located adjacent the beam. For the maximum plow furrow width of 22 inches, the bracket ear is connected to the beam by a bolt extending through the beam and ear and a nut that maintains this width. For a 20 inch furrow width, a tapered shim or spacer is mounted between the ear and beam. The shim has an elongated opening for the bolt. A furrow width of 18 inches requires two shims, a 16 inch furrow width requires three and a 14 inch furrow width requires four shims. The shims are identical and have structure to prevent relative movement therebetween. Specifically, each shim has preferably two spaced projections extending from one side and complementary indentations from the other side. When succeeding shims are utilized, the projections of a shim extend into the indentations of another—to essentially nest within the other—thereby preventing excessive looseness in the combination. When a shim is not used, it is mounted on the bolt adjacent the ear but not between the ear and beam to prevent loss of the shim.

As noted, the adjustment of each plow unit can be easily made with the plow units out of the soil by merely removing the nut and swinging the bracket about its vertical pivot and removing or adding shims to achieve the desired furrow width and again tightening the nut to maintain same. Since the rear wheel carrying frame is fastened to the rear plow unit, as the rear plow unit is swung around the vertical pivot, the tail wheel itself is rotated to maintain its correct position relative to the rear plow unit. Upon the plow system pivoting to the new furrow widths, the steering linkage automatically straightens the tail wheel for this furrow width. No adjustment of the tail wheel is normally required through most of the range of plow unit adjustment. Lateral hitch adjustments may be required for the now pivoted plow systems, but this also will be only for the larger adjustments.

It is therefore, an object of this invention to provide a new and improved variable width plow system.

Another object of this invention is to provide a variable width plow system with quick manual adjustment for each plow unit.

BRIEF DESCRIPTION OF THE DRAWINGS

FIG. 5 is a side view of an adjusting shim; and

FIG. 6 is a plan view of the shim of FIG. 5.

DESCRIPTION OF THE PREFERRED EMBODIMENT

Figure 1:
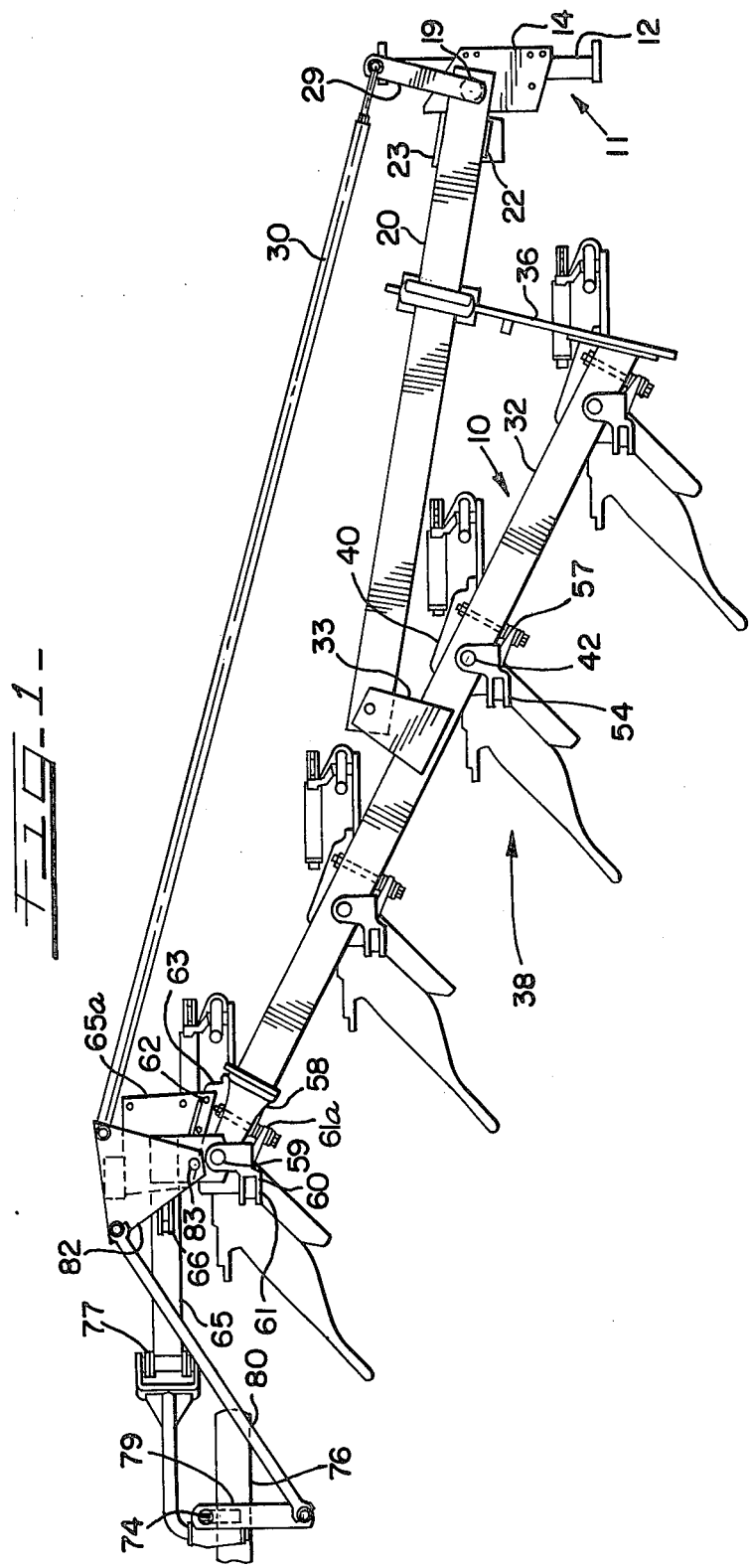
FIG. 1 is a plan view of the plow system of this invention.
Figure 2:
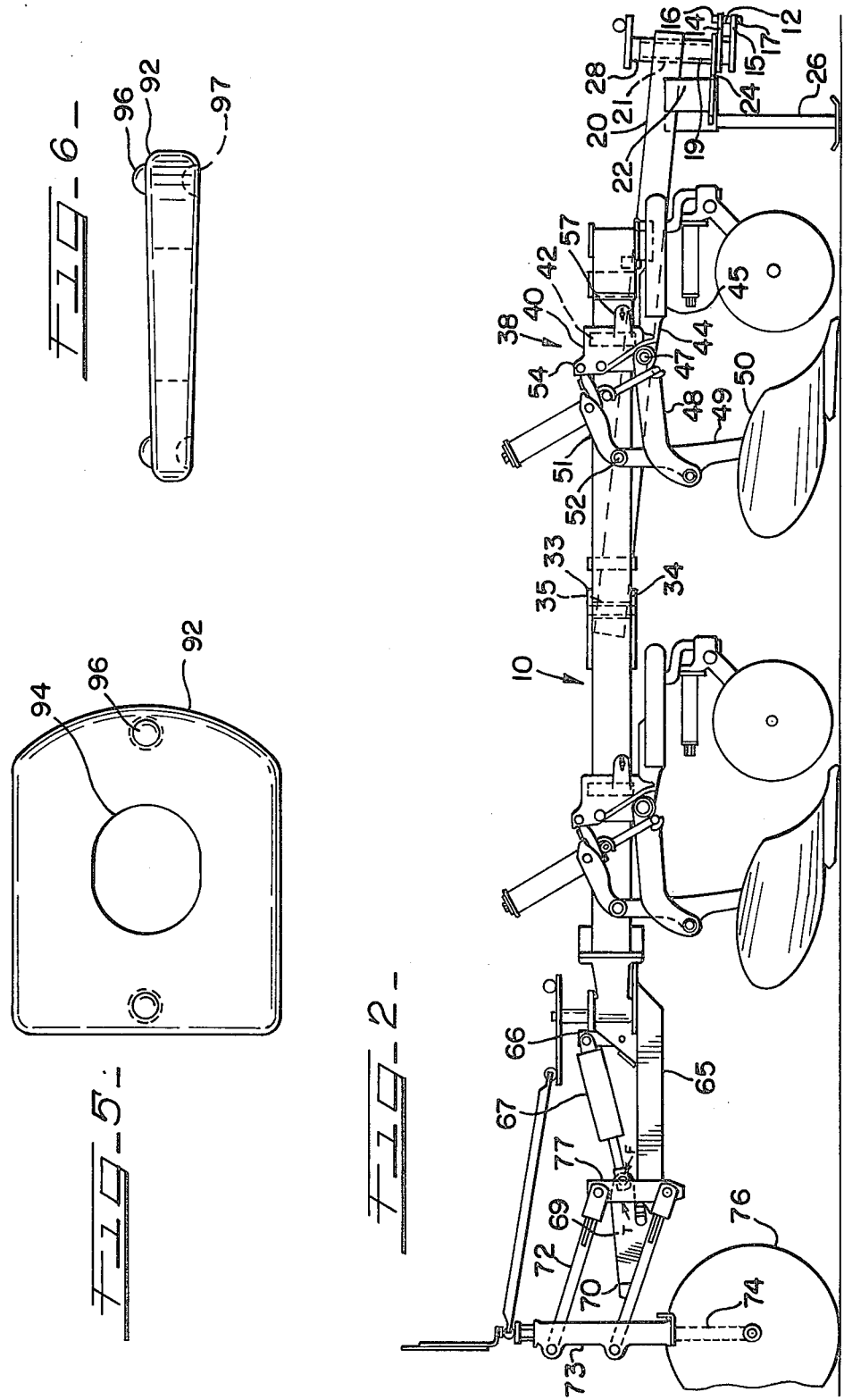
FIG. 2 is a side elevational view of the plow system with some plow units not shown in the interest of clarity.

Referring to FIGS. 1 and 2, 10 indicates the plow system of the invention in the plowing position with the plow units set for 18 inch width furrows. Plow system 10 has a hitch 11 for connection to a tractor. Hitch 11 includes transverse bar 12 for attachment to a tractor with movement about a horizontal axis. Upper and lower plates 14 and 15 are attached to bar 12 by bolts 16 and nuts 17. Shaft 19 is rigidly connected to plates 14 and 15 and extends generally vertically therefrom. Main beam 20 of the plow system 10 has openings in which to rigidly mount sleeve 21 which is rotatable about shaft 19. Reinforcing plates 22 and 23 are welded to beam 20 and extend downwardly to join with plate 24 which also has an opening for the rigid mounting of sleeve 21. By loosening the bolts 16 in plates 14 and 15, bar 12 may be positioned relative the main beam 20 as needed for the various furrow widths. When plow system 10 is not connected to a tractor, stand 26 connected to main beam 20 provides support for the front of the plow system 10.

Collar 28 having arm 29 is rigidly connected to shaft 19 by pins or the like. Arm 29 is pivotally connected to tie rod 30. Shaft 19, therefore, rotates with cross bar 12 when the tractor is turned. Main beam 20, at the rear end thereof, is pivotally connected to upper and lower plates 33 and 34 by sleeve 35 extending therebetween. Plates 33 and 34 are rigidly connected to inclined beam 32. Brace bar 36 is also rigidly connected to inclined beam 32 by suitable fasteners and main beam 20 by an adjustable mounting for adjustment about sleeve 25 to provide necessary adjustments over the wide range of furrow width settings. Of course, when all elements are secure, main beam 20 is rigidly connected to inclined beam 32.

Although four plow units are shown in FIG. 1, only one will be described as all are identical except for the added structure at the tail section. Again referring to FIGS. 1 and 2, plow unit 38 includes bracket 40 having vertical holes for vertical pivot pin 42 which also extends through inclined beam 32 through a suitable bore for rotation therein with bracket 40. Bracket 40 also has longitudinally extending lower vertical flange 44 having numerous bolting holes for spring type colter assembly 45. Bracket 40 further has a lower transverse bore for shaft 47 for link 48 that is pivotally connected to standard 49 that supports plow 50. Linkage 51 extends between a pivotal connection 52 with standard 49 and clevis 54 on bracket 40. The linkage shown is similar to that disclosed in U.S. Pat. No. 3,321,027 issued May 23, 1967 to 0. E. Johnson, et al. for Self-Restoring Plow Trip which is assigned to subject Assignee. Although this trip linkage is disclosed, it is apparent that any suitable linkage could be used with the bracket 40 of plow unit 38. Bracket 40 also has laterally extending ear 57 for the later to be described mechanical adjustment of bracket 40 and hence plow unit 38.

On the rearmost end of inclined beam 32 is bracket 58 which is fastened thereto by suitable means. Bracket 58 has a vertical opening therethrough for shaft 59 rotatable therein which supports bracket 60 for rotation therewith. Bracket 60 is similar to bracket 40 (see FIG. 1) having linkage clevis 61 and ear 61a but has additional structure including holes 62 in lower portion 63 for tail section 65 fastened thereto via plate 65a. Tail section 65 also includes arm 66 for hydraulic cylinder 67 having a rod end pivotally connected to plate 69 fixed to lower bar 70 of a parallel bar linkage that includes upper bar 72. The ends of both bars are pivotally connected to housing 73 of vertical shaft 74 that connects directly and rigidly to tail and steering wheel 76. Inasmuch as wheel 76 cannot move into the ground, the housing 73 is the fixed section of the linkage and when the cylinder rod is extended, the lower bar is forced downwardly and since, resisted by the ground, the other link 77 connected to the front ends of bars 70 and 72, raises vertically also raising the end of inclined beam 32. The tail wheel lift linkage is conventional and has a plow position shown, a transport and a float position.

Connected directly but pivotally to arm 79 rigid with shaft 74 is tie rod 80. Tie rod 80 at the other end is pivotally connected to plate 82 which is connected to shaft 83 rotatably supported on plate 65a of tail section 75. Also pivotally connected to plate 65a is the rear end of tie rod 30.

It should be noted that the steering of the tail wheel is conventional. For example if the tractor is turned to the left (when standing to the rear of the plow system and looking toward the rear end of the tractor), shaft 19 rotates with transverse bar 12 counterclockwise and since fixed therewith, arm 29 pushes tie rod 30 rearward. This rotates plate 82 counterclockwise about shaft 83 which pushes tie rod 80 rearward and connected arm 79 rotates shaft 74 and thus wheel 76 clockwise so that wheel 76 will cause the rear end of plow system 10 to move to the right so that same stays behind the tractor. A turn to the right of the tractor will pull on tie rod 30, plate 82, tie rod 80 and arm 79 to cause wheel 76 to move counterclockwise and stay behind the tractor.

Figure 3:
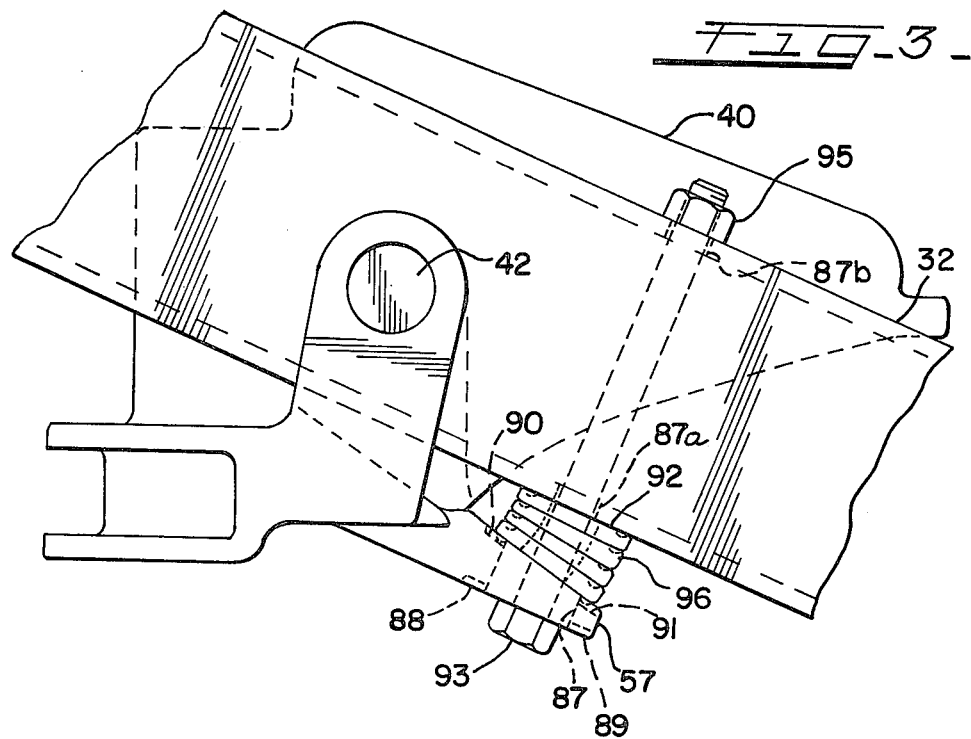
FIG. 3 is an enlarged plan view of the mechanical adjustment of a single plow unit.
Figure 4:
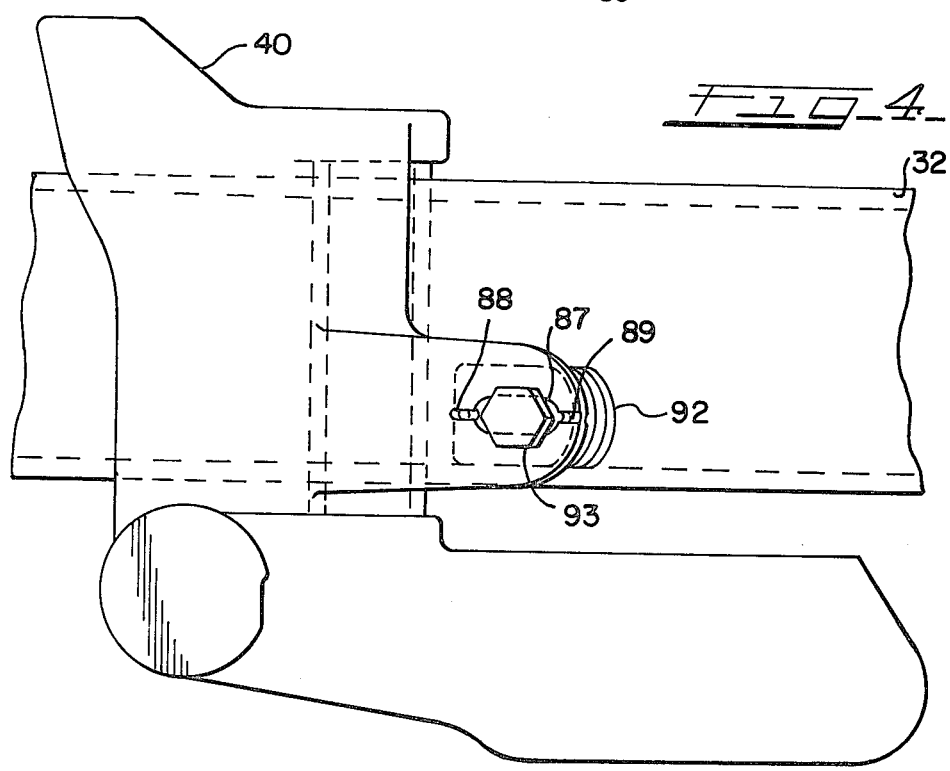
FIG. 4 is a side view of the unit of FIG. 3.

The mechanical adjustment for each plow trip unit is shown to a larger scale in FIGS. 3 and 4. As noted, each bracket 40 has an ear 57 and also similar bracket 60 has an ear 61a that extends laterally therefrom and is located adjacent inclined beam 32. Since similar, only bracket 40 will be discussed. Ear 57 has elongated hole 87 extending therethrough. Inclined beam 32 has aligned circular holes 87a and 87b in its opposed side walls. Also, on the outside surface of ear 57 are grooves 88 and 89 that extend forward and rearwardly from hole 87. Similar grooves 90 and 91 are provided on the inside of ear 57. FIG. 3 discloses four tapered shims 92 (also see FIGS. 5–6) mounted between the ear 57 and the inclined beam 32 which, since bracket 40 has been rotated clockwise about 42 and thus the attached plow this "closes" the plow and, hence, provides a 14 inch width furrow. Bolt 93 extending through slotted hole 87 in ear 57 and the holes 87a and 87b in inclined beam 32 along with slotted holes 94 in the shims 92 with nut 95, maintains the plow unit in the selected furrow width. Removal of a shim 92 (all of which are identical) allows the pivoting of bracket 40 about pin 42 and opens the plow. The use of three shims produces a 16 inch furrow width, two shims—18 inches, one shim—20 inches and no shims—22 inches. The shim 92 is shown in detail in FIGS. 5 and 6. As noted the shim has slotted hole 94 for the bolt and a pair of spaced projections 96 that extend from one side and indentations 97 from the other side. Thus, when the shims are assembled as shown in FIG. 3, the first shim has its flat side to the inclined beam and its projections extending from the other side toward the next shim to engage the indentations therein. This continues until the projections of the last shim engage the grooves 90 and 91 on the inside surface of ear 57. Where a shim is mounted adjacent outside ear 27, the shim identations engage grooves 88 and 89 and are also held thereto by nut 95 threaded to bolt 93. Thus, the shims constitute a nested package which, while providing the 14 to 22 inch range of adjustment, still are securely held in position by the bolt 93 and nut 95 to maintain the desired furrow width.

As is appparent from FIGS. 1, each plow unit has the same mechanical adjustment including the plow associated with the tail wheel. Thus, as shown, with two shims 92 between the ear 57 and ear 61a and inclined beam 32, all of the plows will provide 18 inch furrows. FIG. 1 also shows the location of the now rigid system with the plows aligned with the travel of the tractor. Of course for other furrow widths in which the inclination of the plows is altered, the system must pivot about generally vertical shaft 19 attached to bar 12 so that the plows are again parallel to the direction of travel. Since a tail wheel section is involved and related to the rotatable plowing unit there is no desire to alter the connection of the tail wheel itself to the linkage needed for normal steering. The movement of the plow system is utilized to properly position the tail wheel for the various plowing widths. In this conventional construction, a collapsible parallelogram is utilized. This parallelogram consists of the shaft 19 which is the pivot for main beam 20 of the plow system 10, pivot shaft 59 on the inclined beam rear end, the rear pivotal connection of tie rod 30 on plate 82 and the front pivotal connection of tie rod 30 on arm 29. The fixed part of the parallelogram is arm 29 as the tractor and thus hitch 11 does not move. Thus, when the plow units 38 and the tail section are adjusted from the 18 inch furrow widths of FIG. 1 by removing the two shims per unit and rotating the units counterclockwise to where ear 57 and ear 61a are against inclined beam 32 (and the plows thus opened to the 22 inch furrow width) the movement of the last plow on the tail section also rotates housing 73 about shaft 74. With the steering linkage fixed, movement of housing 73 pulls thereon and the linkage (via the tie rods) therefore pulls wheel 76 so same is directed toward the left side of the plow system. When the system is moved forward, the system, due to the wheel direction, also moves toward the left and the parallelogram also, with the imaginary line between shaft 59 and the rearmost connection of tie rod 30 remaining parallel to arm 29. As the wheel approaches a position parallel with travel, due the collapsing parallelogram, tie rods 30 and 80 connected thereto push wheel 76 until same is parallel at that point and thus properly set for the 22 inch furrow width and the comparable positioning of the plow system.

It is felt that the operation of the system is readily apparent from the description detailed above. The parallelogram also provides a compensating means to the steering system so same can remain connected at all times for normal steering and furrow width adjustment.

It should be apparent that applicants' large range of mechanical adjustment can be quickly and positively made in a simplified plow system having a plurality of plow units including one with a tail wheel and that no further adjustments such as the tail wheel need be made. For greater efficiency, the hitch may have to be moved laterally to provide an improved line of draft for different furrow widths but this is necessary only at the widest range of the adjustment as is any tail wheel adjustment.

What is claimed is:

1. A plow system adapted to be connected to and pulled by a tractor comprising:
   a hitch member adapted for attachment to the tractor and providing a vertical pivot axis;
   a main beam assembly connected to said hitch for pivoting movement about said vertical pivot axis, said main beam assembly including a main beam inclined relative to the direction of travel of said plow system;
   a tail section supported from the rear end of said main beam and including a tail wheel supporting said beam;
   steering means connected between the hitch and said tail wheel and adapted to be responsive to turning of the tractor for turning said tail wheel in a direction opposite to the direction of turning of the tractor;
   a plurality of plow bottoms; and
   means for mounting each of said plurlity of plow bottoms in equally spaced positions along said beam, each of said mounting means comprising a bracket having a vertical bore rotatably engaged with a vertical pivot pin mounted on said main beam, said bracket further including a laterally extending ear disposed adjacent said main beam, and shim means disposed between said main beam and said ear for setting and maintaining the horizontal inclination of said bracket relative to said beam in one of a plurality of rotated positions of adjustment corresponding to the desired lateral spacing between furrows formed by said plow bottoms.

2. The plow system of claim 1 in which the shim means for setting and maintaining the inclination includes a fastener and a tapered shim located between said ear and beam and having an opening therethrough for said fastener.

3. The plow system of claim 2 in which a plurality of shims are located between said ear and beam.

4. The plow system of claim 3 in which four shims are utilized.

5. The plow system of claim 3 in which all of the shims are identical and in which the openings are slotted in nature and said ear has a slotted opening for said fastener.

6. The plow system of claim 5 further comprising means for preventing relative motion between the shims.

7. The plow system of claim 6 in which said means for preventing relative motion between said shims is a spaced pair of projections extending from a side of each shim and a pair of complementary indentations from the other side, said shims being located adjacent each other so that the projections of a shim extend into the indentations of another shim, said ear also having indentations for the projection of the shim adjacent thereto.

8. The plow system of claim 7 in which the shims not positioned between said ear and beam are mounted on said fastener outward of said ear to store same, said outward side of said ear also having indentations for the projections of the shim adjacent thereto.

* * * * *